(12) United States Patent
Rimann et al.

(10) Patent No.: US 6,520,299 B2
(45) Date of Patent: Feb. 18, 2003

(54) DISK BRAKE FOR ELEVATOR DRIVE

(75) Inventors: André Rimann, Oberrohrdorf (CH); Renate Murer, Ebikon (CH)

(73) Assignee: Inventio AG, Hergilswil NW (CH)

( * ) Notice: Subject to any disclaimer, the term of this patent is extended or adjusted under 35 U.S.C. 154(b) by 40 days.

(21) Appl. No.: 09/843,223

(22) Filed: Apr. 26, 2001

(65) Prior Publication Data

US 2001/0052440 A1 Dec. 20, 2001

(30) Foreign Application Priority Data

Apr. 27, 2000 (EP) .............................. 00810361

(51) Int. Cl.[7] ................................. B66B 1/32
(52) U.S. Cl. ....................... 188/171; 187/288
(58) Field of Search .................. 188/171; 187/350, 187/288, 298

(56) References Cited

U.S. PATENT DOCUMENTS

| 4,066,152 A | * | 1/1978 | Pascal .................. 188/171 |
| 5,101,939 A | * | 4/1992 | Sheridan ............... 188/171 |
| 5,253,738 A | * | 10/1993 | Vertesy et al. ......... 188/171 |
| 5,873,434 A | * | 2/1999 | Sugita et al. .......... 187/288 |
| 5,957,247 A | | 9/1999 | Zylstra et al. |

FOREIGN PATENT DOCUMENTS

| DE | 196 09 764 | 12/1996 |
| EP | 0 535 344 | 4/1993 |
| GB | 859 527 | 1/1961 |
| GB | 1 017 561 | 1/1966 |
| JP | 10 331 885 | 12/1998 |

* cited by examiner

Primary Examiner—Matthew C. Graham
(74) Attorney, Agent, or Firm—MacMillan, Sobanski & Todd, LLC

(57) ABSTRACT

An elevator drive includes a casing with a shaft supported by spaced shaft bearings. Arranged on the shaft between the bearings are a traction sheave and a brake disk. On a free end of the shaft is a motor ventilated by fans. Arranged on the casing is a symmetrically constructed braking device with two single-arm brake levers having brake linings which, when braking occurs, press against the traction sheave and bring it to a standstill. Provided on a free end of each brake lever is a compression spring that is supported at one end on the brake lever and on the other end on a spring pin. The spring force of the compression spring acts on the brake lever thereby causing the brake lining to press against the traction sheave. To release the brake lever, a brake magnet provided with an armature plate is arranged on a brake lever, the brake magnet and the armature plate acting against the force of the compression springs.

15 Claims, 6 Drawing Sheets

DISK BRAKE FOR ELEVATOR DRIVE

BACKGROUND OF THE INVENTION

The present invention relates to a disk brake for an elevator drive, the brake having brake levers with brake linings, compression springs, and a brake magnet, the brake levers being caused by the force of the compression springs to act through the brake linings on a brake disk and bring the elevator drive to a standstill, and the brake levers being released by the brake magnet acting on the brake levers against the force of the compression springs.

The European patent specification EP 0 535 344 shows a disk brake that acts on a brake disk of an elevator drive, the symmetrically constructed disk brake thereby bringing the elevator drive to a standstill. Two brake levers are pivoted on a rigid supporting bracket. Each brake lever has two arms, there being arranged at one end of the brake lever a brake shoe with a brake lining that acts on the brake disk when braking occurs. Acting on the other end of the brake lever is a compression spring that is supported on a stop and on the brake lever. The compression spring of the second brake lever is also supported on the stop, the stop being movably held in a brake magnet. If the stop moves due to, for example, breakage of a compression spring, a sensor generates an alarm signal. To release the disk brake, the brake magnet, which is fitted with an armature plate, is activated, the brake magnet with the armature plate thereby acting against the force of the compression springs.

A disadvantage of this known device is that the disk brake with its centrally arranged brake magnets is of relatively wide construction and therefore not suitable for situations where space is restricted.

SUMMARY OF THE INVENTION

The present invention provides a solution to avoiding the disadvantages of the above-described known device and creating an elevator drive with a disk brake of narrow construction which can also be easily released manually.

The advantages achieved by the present invention are that the elevator drive can be constructed in modular manner. The elements of the symmetrically constructed brake device are arranged outside the motor area. The motor is therefore easily accessible and easily replaceable. The elements of the brake device are simply constructed and inexpensive to manufacture. The brake device is redundant, and also functions with one brake lever. The single-arm brake levers permit the structure of the elevator drive to be shorter. Furthermore, the brake device can be remotely operated by hand by means of, for example, a Bowden cable. The elements of the brake device are well accessible and easily replaceable. For disassembly it is only necessary to remove the compression springs. The brake device can then be removed upwardly. Maintenance (checking the brake linings, the air gap of the magnet, the parallelism between the brake magnet and armature plate, and the spring pretensioning) is simplified by the brake device according to the present invention. Because the brake device acts directly on the traction sheave, the brake device can be used as a protective device against overspeed of the elevator car in the upward direction.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
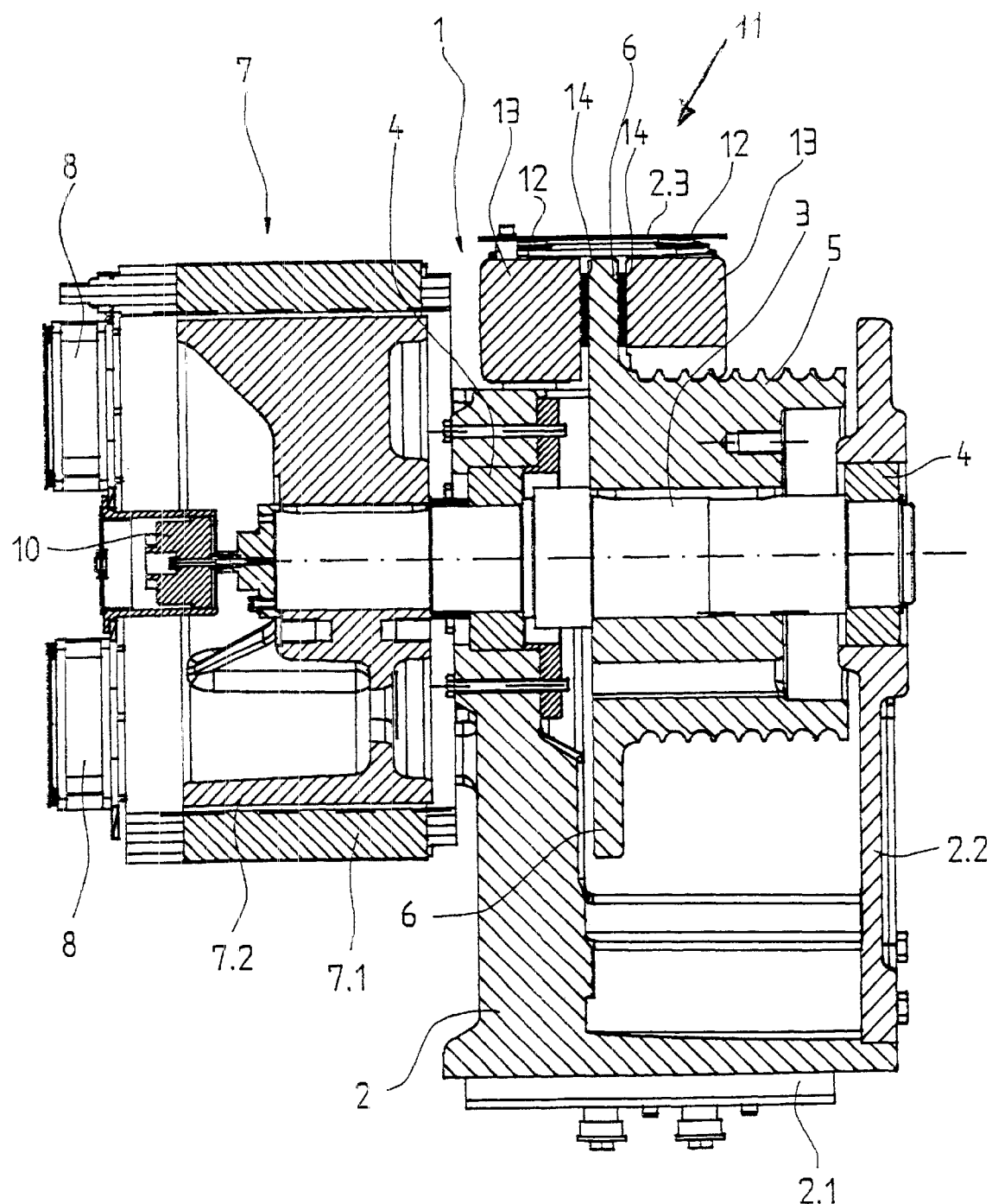
FIG. 1 is a cross-sectional view taken along the line A—A in FIG. 2 through an elevator drive with the brake device according to the present invention.
Figure 2:
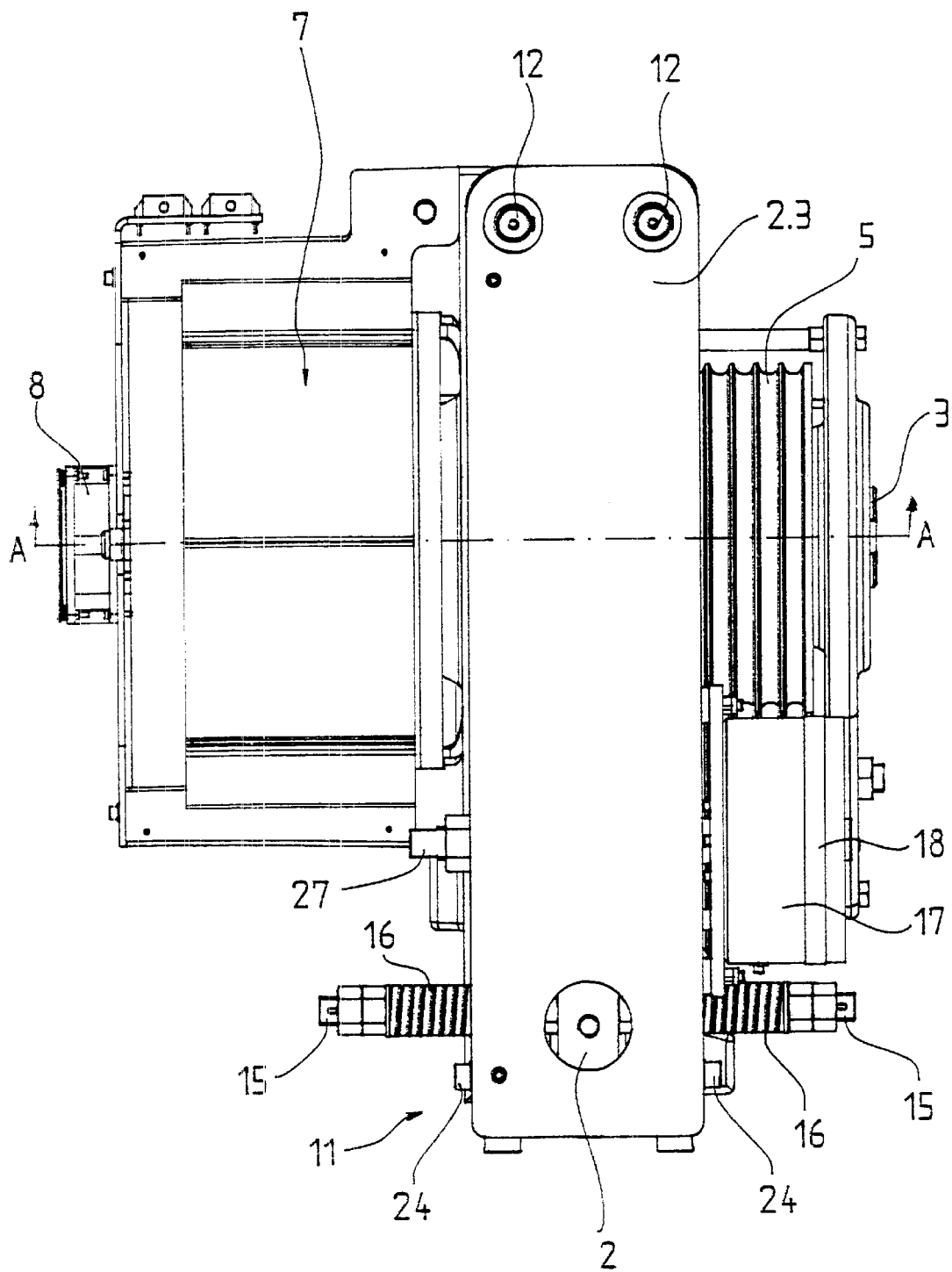
FIG. 2 is a top plan view of an elevator drive with the brake device according to the present invention.
Figure 3:
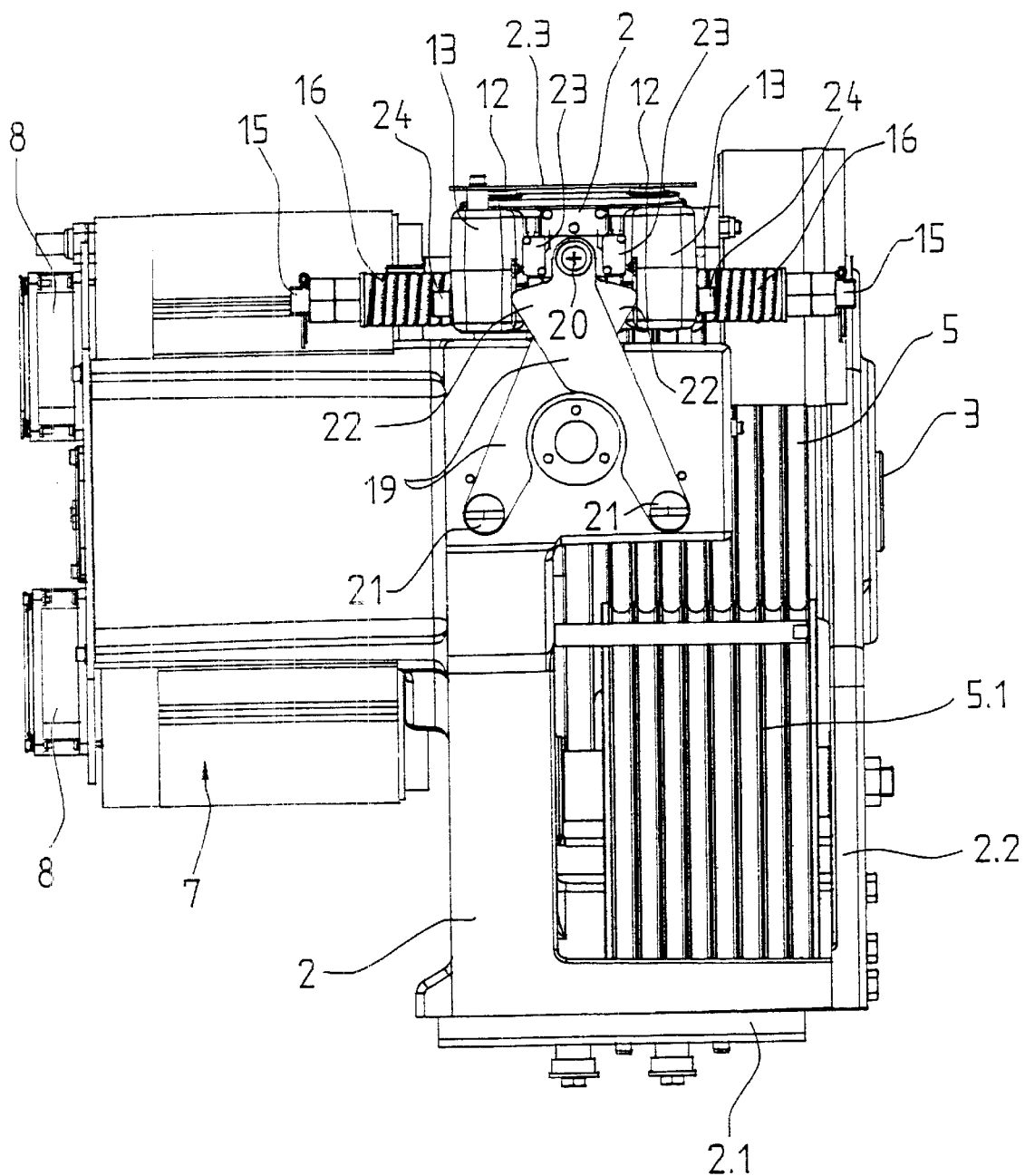
FIG. 3 is a side elevation view of the elevator drive with the brake device shown in FIG. 2.

FIGS. 1–3 show an elevator drive 1 including a casing 2 with a base 2.1, which serves as a damping element, and an endplate 2.2. Supported by bearings 4 in the casing 2 and the endplate 2.2 is a shaft 3, a part of the shaft projecting from the casing as a free end. Arranged on the shaft 3 in between the shaft bearings 4 are a traction sheave 5 and a brake disk 6. Passing over the traction sheave 5 and a deflection pulley 5.1 (FIG. 3) are ropes (not shown) which drive and hold an elevator car (not shown) and a counterweight (not shown). Arranged at the free end of the shaft 3 is a motor 7 with stator 7.1 and rotor 7.2, ventilation of the motor 7 being possible by means of fans 8. Provided at the motor end of the shaft 3 is a revolution sensor 10. The brake disk 6 is provided to bring the shaft 3, and thereby the traction sheave 5, to rest.

Arranged on the casing 2 is a symmetrically constructed brake device 11 that is protected by a cover 2.3. Pivoted on the casing 2 by pins 12 are two single-arm brake levers 13 with brake linings 14 which, when braking occurs, press against the traction sheave 5 to bring it to a standstill. The pins 12 serve as fulcrums for the brake levers 13. At the free end of each of the brake levers 13 is a spring pin 15 that passes through the brake lever and is arranged on the casing 2. The spring pin 15 serves as a guide for a compression spring 16 that rests at one end against the brake lever 13 and at the other end against the spring pin 15. The spring force of the compression spring 16 acts on the brake lever 13, thereby causing the brake lining 14 to press against the traction sheave 5. To release the brake lever 13, there is arranged on the brake lever 13 a brake magnet 17 with an armature plate 18, the brake magnet 17 and the armature plate 18 acting against the force of the compression springs 16.

The brake device 11 can be remotely manually operated with little force, for example from the landing by means of a Bowden cable. For this purpose, on the elevator drive 1, two cam levers 19 are provided at the end of the brake levers 13 to act against the force of the compression springs 16 on the brake levers and release the brake levers. A pin 20 arranged on the casing 2 serves as fulcrum for the two cam levers 19. Arranged at the free end of the cam lever 19 is a pin 21 on which, for example, the Bowden cable acts and moves the pins 21 toward each other. In doing so, a cam 22 of the cam lever 19 acts against the force of the compression spring 16 on a contact surface 28 (FIG. 5) of the brake lever 13 and the brake linings 14 are released from the brake disk 6. To monitor the position of the brake lever 13 there is, for example, a microswitch 23 on each brake lever.

Figure 4:
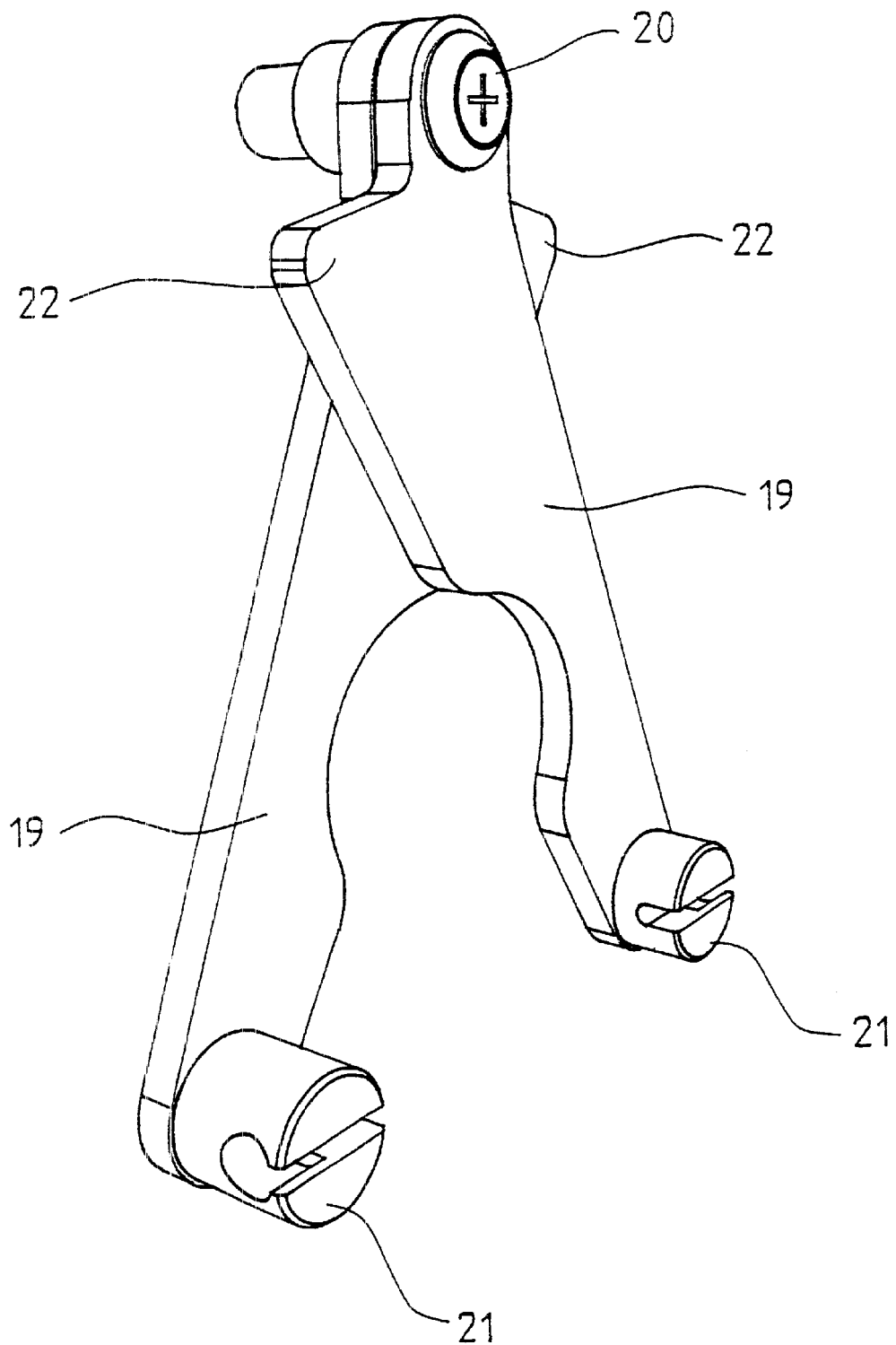
FIG. 4 is a perspective view of cam levers for the manual remote operation of the brake device according to the present invention.

The cam levers 19 with the cams 22 are shown in more detail in FIG. 4 as arranged on the common fulcrum pin 20 to act as force multipliers between the Bowden cable and the compression springs 16. A small force on the Bowden cable can oppose the large force of the compression springs 16. The manual remote operation with force multiplication can also be used, for example, on brake devices with double-arm brake levers.

Figure 5:
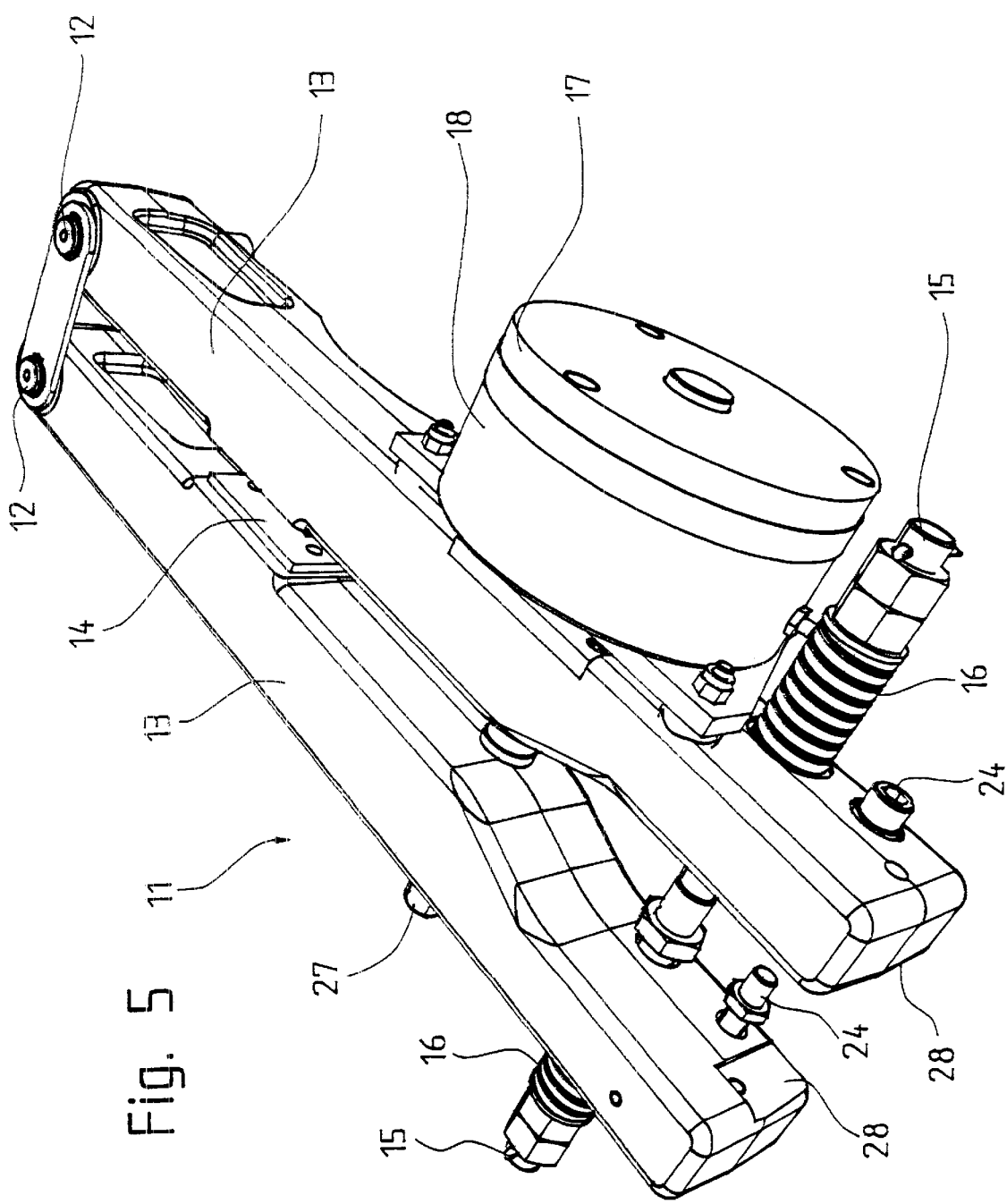
FIG. 5 is a perspective view of the brake device according to the present invention.

FIG. 5 shows the brake device 11 without the cam levers 19. Two independent brake halves each comprise a brake lever 13 with the braking 14, the pin 12, the compression spring 16, the spring pin 15 arranged on the casing 2, and an adjusting screw 24. Not shown in FIG. 5 is the casing part 2 on which the spring pins 15 are arranged, and against which the adjusting screws 24 rest. To release the brake lining 14, the brake magnet 17 acts together with the armature plate 18 according to the action/reaction principle simultaneously on the two brake levers 13. To prevent only one of the brake levers 13 from opening, the movement of each brake lever is limited and adjustable by means of the adjusting screw 24.

Figure 6:
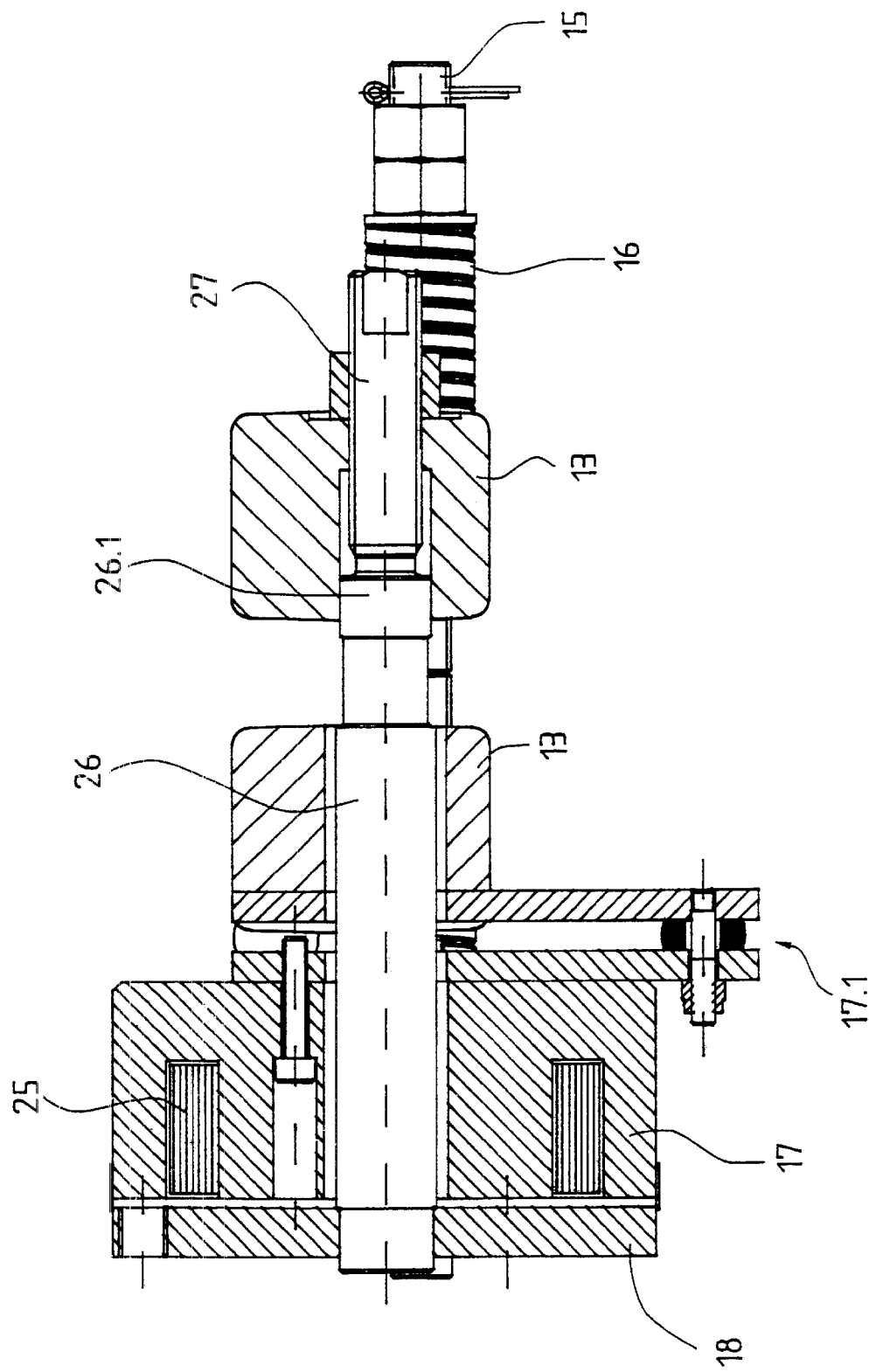
FIG. 6 is a cross-sectional view through the brake magnet for magnetic remote operation of the brake device shown in FIG. 5.

FIG. 6 shows a section through the brake magnet 17 and the armature plate 18. The brake magnet 17 is arranged on one of the brake levers 13. The armature plate 18 is movable relative to the brake magnet 17. By means of a magnetic force generated by a coil 25, which can be remotely electrically operated by the elevator control, the armature plate 18 is moved toward the brake magnet 17. A plunger 26 arranged on the armature plate 18 passes through the brake magnet 17 and the one of the brake levers 13 and ends in the other one of the brake levers connected to a sliding bearing 26.1. The bearing 26.1 is coupled to an adjusting screw 27 that is joined to the other one of the brake levers 13. The adjusting screw 27 can be rotated to limit the travel of the armature plate 18. The parallelism between the brake magnet 17 and the armature plate 18 can be set by means of an adjusting device 17.1 comprising a bolt, a nut, and a rubber element. The adjusting device 17.1 is connected between the one brake lever 13 and the brake magnet 17.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A disk brake for an elevator drive having a traction sheave connected to a brake disk, the disk brake comprising:
    a pair of brake levers each having a fulcrum end for pivotal mounting and a free end;
    a pair of brake linings, each said brake lining being attached to an associated one of said brake levers between said fulcrum end and said free end;
    a pair of compression springs, each said compression spring acting upon an associated one of said brake levers between said brake lining and said free end; and
    a brake release means acting on said brake levers whereby when said the brake levers are pivotally mounted on a casing of an elevator drive on opposite sides of a brake disk of the elevator drive with said fulcrum ends adjacent one another said brake linings adjacent opposite surfaces of the brake disk, said compression springs force said brake linings into engagement with the brake disk to prevent rotation of a connected traction sheave to bring the elevator drive to a standstill, and said brake levers being released by selective actuation of said brake release means acting on said brake levers against a force of said compression springs, said brake release means including a pair of manually remotely actuatable cam levers movable about a fulcrum point, each of said cam levers being engagable with an associated one of said brake levers to move said brake levers against the force of said compression springs.

2. The disk brake according to claim 1 wherein said brake release means includes a remotely operated magnetic means.

3. The disk brake according to claim 2 wherein said brake release means includes a brake magnet with an armature plate, said brake magnet being mounted on one of said lever arms and said armature plate being coupled to another of said lever arms, whereby when said brake magnet is actuated, said armature plate is attracted to said brake magnet against the force of said compression springs to move said brake levers toward the opposite surfaces of the brake disk.

4. The disk brake according to claim 3 including a plunger connected between said armature plate and said another brake lever.

5. The disk brake according to claim 4 wherein said plunger extends through said brake magnet and said one brake lever and terminates in said another brake lever, and including an adjusting screw in said another brake lever coupled to said plunger for limiting travel of said plunger.

6. The disk brake according to claim 3 including an adjusting device connected between said brake magnet and said one brake lever for setting parallelism between said brake magnet and said armature plate.

7. The disk brake according to claim 1 wherein each said cam lever has a cam formed thereon for engaging a contact surface formed on an associated one of said brake levers.

8. The disk brake according to claim 7 wherein each said cam lever has a pin for connecting to a Bowden cable.

9. An elevator drive having a disk brake comprising:
    a casing rotatably mounting a shaft to which is attached a traction sheave and a disk brake;
    a pair of brake levers each having a fulcrum end pivotally mounted on said casing and a free end, said brake levers extending on opposite sides of said brake disk and each having a brake lining attached between said fulcrum end and said free end;
    a pair of compression springs, each said compression spring acting upon an associated one of said brake levers between said brake lining and said free end; and
    a brake release means acting on said brake levers whereby said compression springs force said brake linings into engagement with said brake disk to prevent rotation of said traction sheave to bring the elevator drive to a standstill, and said brake levers being released by selective actuation of said brake release means acting on said brake levers against a force of said compression springs, said brake release means including a pair of manually remotely actuatable cam levers movable about a fulcrum point on said casing, each of said cam levers being engagable with an associated one of said brake levers to move said brake levers against the force of said compression springs.

10. The disk brake according to claim 9 wherein said brake release means includes a remotely operated magnetic means.

11. The disk brake according to claim 10 wherein said brake release means includes a brake magnet with an armature plate, said brake magnet being mounted on one of said lever arms and said armature plate being coupled to another of said lever arms, whereby when said brake magnet is actuated, said armature plate is attracted to said brake magnet against the force of said compression springs to move said brake levers toward the opposite surfaces of the brake disk.

12. The disk brake according to claim 11 including a plunger connected between said armature plate and said another brake lever, said plunger extending through said brake magnet and said one brake lever and terminating in said another brake lever, and including an adjusting screw in said another brake lever coupled to said plunger for limiting travel of said plunger.

13. The disk brake according to claim 11 including an adjusting device connected between said brake magnet and said one brake lever for setting parallelism between said brake magnet and said armature plate.

14. The disk brake according to claim 9 wherein each said cam lever has a cam formed thereon for engaging a contact surface formed on an associated one of said brake levers.

15. The disk brake according to claim 14 wherein each said cam lever has a pin for connecting to a Bowden cable.

* * * * *